US007260074B2

(12) United States Patent
Väre

(10) Patent No.: US 7,260,074 B2
(45) Date of Patent: Aug. 21, 2007

(54) HANDOVER DECISION FOR IP SERVICES BROADCASTED ON A DVB NETWORK

(75) Inventor: Jani Väre, Jahtilähteenkatu (FI)

(73) Assignee: Nokia Corporation (FI)

( * ) Notice: Subject to any disclaimer, the term of this patent is extended or adjusted under 35 U.S.C. 154(b) by 123 days.

(21) Appl. No.: 10/334,822

(22) Filed: Dec. 31, 2002

(65) Prior Publication Data

US 2004/0125769 A1   Jul. 1, 2004

(51) Int. Cl.
H04Q 7/20 (2006.01)
(52) U.S. Cl. ........................... 370/331; 455/437
(58) Field of Classification Search ........ 370/328–329, 370/331–333, 340–341; 455/436–443; 725/62
See application file for complete search history.

(56) References Cited

U.S. PATENT DOCUMENTS

| 5,513,246 | A * | 4/1996 | Jonsson et al. ............ 455/443 |
| 6,038,449 | A * | 3/2000 | Corriveau et al. .......... 455/439 |
| 6,295,450 | B1 * | 9/2001 | Lyer et al. ................. 455/436 |
| 6,400,951 | B1 * | 6/2002 | Vaara ........................ 455/436 |
| 6,628,949 | B1 * | 9/2003 | Park .......................... 455/436 |
| 6,701,149 | B1 * | 3/2004 | Sen et al. .................. 455/436 |
| 2002/0107020 | A1 * | 8/2002 | Lee ............................. 455/436 |
| 2002/0191567 | A1 | 12/2002 | Famolari et al. |
| 2003/0016639 | A1 * | 1/2003 | Kransmo et al. ........... 370/335 |
| 2003/0022670 | A1 * | 1/2003 | Hassan et al. .............. 455/434 |
| 2003/0069018 | A1 * | 4/2003 | Matta et al. ................. 455/436 |
| 2003/0083066 | A1 * | 5/2003 | Shin et al. .................. 455/433 |
| 2003/0142647 | A1 * | 7/2003 | Agrawal et al. ............ 370/331 |
| 2003/0174670 | A1 * | 9/2003 | Mar et al. .................... 370/328 |
| 2004/0109425 | A1 * | 6/2004 | Scribano et al. ............ 370/331 |
| 2004/0196808 | A1 * | 10/2004 | Chaskar et al. ............. 370/331 |
| 2005/0159164 | A1 * | 7/2005 | Leedom ....................... 455/450 |
| 2005/0207340 | A1 * | 9/2005 | O'Neill ...................... 370/230 |
| 2006/0002345 | A1 * | 1/2006 | Lapraye ...................... 370/331 |
| 2006/0099952 | A1 * | 5/2006 | Prehofer ..................... 455/440 |

FOREIGN PATENT DOCUMENTS

KR   1996-0027488   7/1996

* cited by examiner

Primary Examiner—Wing Chan
Assistant Examiner—Gregory Sefcheck
(74) Attorney, Agent, or Firm—Banner & Witcoff, Ltd.

(57) ABSTRACT

Mobile terminals and methods are provided for making handover decisions based on the priority of IP streams that are being received by a mobile terminal. The IP streams currently being received or requested are ranked according to their priority. The selection of a new cell during the handover procedure is a function of the ranking of priorities.

13 Claims, 3 Drawing Sheets

HANDOVER DECISION FOR IP SERVICES BROADCASTED ON A DVB NETWORK

BACKGROUND OF THE INVENTION

1. Field of the Invention

The invention relates to handover decisions for mobile terminals receiving Internet protocol (IP) streams broadcasted over digital broadband transmission networks. More particularly, the invention relates to making handover decisions based on the priority of IP streams.

2. Description of Related Art

Digital broadband transmission networks are used to transport digital data that includes High Definition TV, multiple channel standard definition TV (PAL/NTSC or SECAM) and, of course, broadband multimedia data and interactive services. An example of such a network is that defined by the Advanced Television Systems Committee (ATSC). Another example of such a network enjoying popularity in Europe and elsewhere world-wide is Digital Video Broadcasting (DVB) which, like ATSC, in addition to the delivery of television content, is also capable of delivering IP data. Both ATSC and DVB utilize a containerization technique in which content for transmission is multiplexed into MPEG-2 transport streams that act as data containers. These MPEG-2 transport streams are broadcast over plural signals and may include several IP streams.

Typical handover techniques for mobile terminals moving within or between cells involve determining which cell, carrying the currently received or requested service, has the highest signal strength. Usually it is assumed that a mobile terminal is receiving only one service at the time of handover. These techniques work well e.g. in the case where only 'regular' DVB services are being received. These 'regular' DVB services are composed of audio, video and private data streams, all needed for one service (e.g. TV program or movie). However, when digital broadband transmission networks are used to carry IP services transmitted over plural IP streams, the handover decision is not that simple. IP services are by nature different from the regular DVB services. Thus, when usually only one of those 'regular DVB services' is being received at the time of handover, the number of simultaneously received IP services may be easily close to 10 services or more. In the case where all available cells are providing mutually identical IP services, the problem doesn't exist and the handover decision can be based solely on the signal strength. However, this is not the case, especially when the handover is done in the network where the content of the cells is mutually heterogeneous, or moreover, when handover is done between the cells originating from two different networks.

Therefore, there is a need in the art for systems and methods to optimize handover from one cell to another cell to correspond to the needs of the user consuming services.

BRIEF SUMMARY OF THE INVENTION

One or more of the above-mentioned needs in the art are satisfied by the disclosed systems and methods that base handover decisions on the particular IP streams being broadcasted by cells. The interruption of priority IP streams and services can be minimized.

In a first embodiment, a method of making a handover decision for a mobile terminal that is receiving at least two IP streams broadcasted over a digital broadband transmission network is provided. The method includes identifying at least two potential cells and ranking the priority of the IP streams that are received by the mobile terminal. A cell is selected based on the ranking.

In another embodiment of the invention, a mobile terminal configured to process at least two IP streams broadcasted over a digital broadband transmission network is provided. The mobile terminal includes a receiving module that receives the IP streams. A ranking module ranks the priority of the IP streams and a handover module selects a new cell during a handover procedure based in part on information received from the ranking module.

In other embodiments of the invention, computer-executable instructions for implementing the disclosed methods are stored on computer-readable media.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
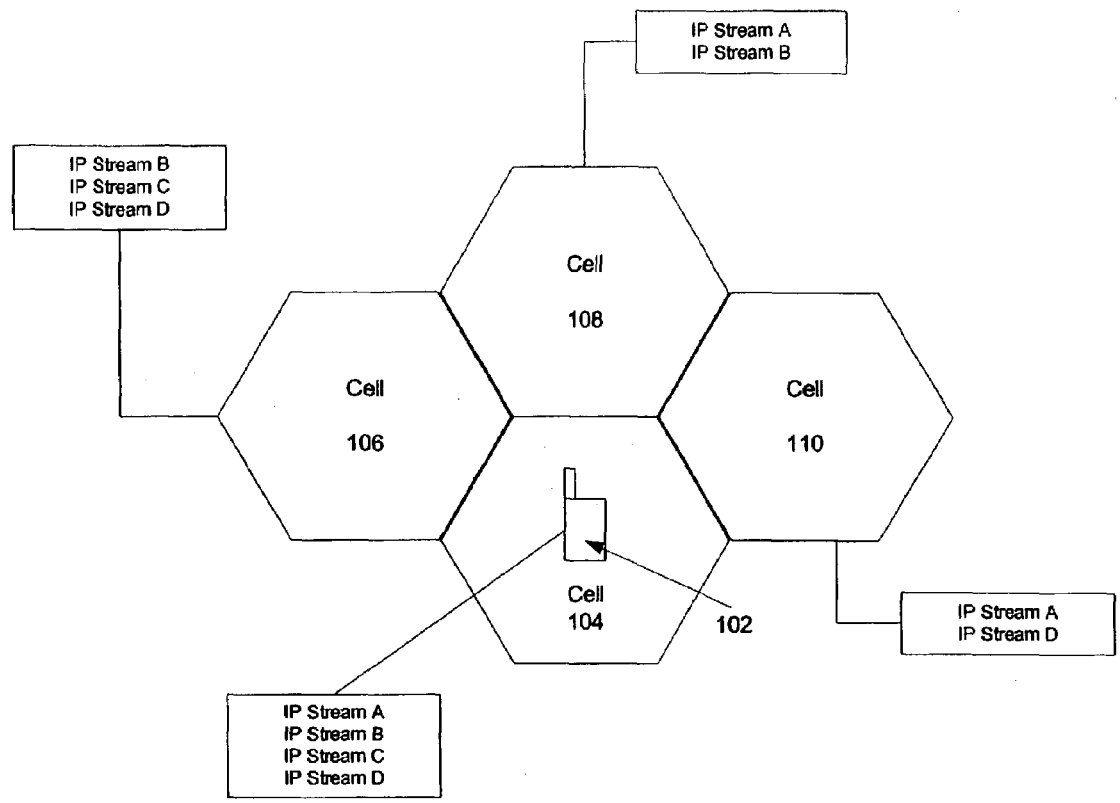
FIG. 1 illustrates a mobile terminal analyzing IP streams broadcasted by neighboring cells, in accordance with an illustrative embodiment of the invention.

FIG. 1 illustrates a mobile terminal 102 moving within a digital broadband transmission network that includes cells 104, 106, 108 and 110. Each cell represents the coverage area of a transmitter. The transmission of the transmitter may be a broadcast, multicast or unicast. Mobile terminal 102 receives four IP streams that are being broadcast by cell 104. In particular, mobile terminal 102 receives IP streams A, B, C, and D. Each IP stream may correspond to one or more IP services. Cell 106 broadcasts IP streams B, C and D. Cell 108 broadcasts IP streams A and B and cell 110 broadcasts IP streams A and D. Assume for purposes of illustration that the IP priority of the IP streams from highest to lowest is A, B, C and then D.

During a handover procedure from cell 104 to one of the other cells, mobile terminal 102 may first analyze the IP streams being broadcasted by each of the neighboring cells. A handover procedure may be required when mobile terminal 102 is traveling. Cells 108 and 110 both broadcast the highest priority IP stream, IP stream A. Cell 106 broadcasts the greatest number of IP streams, but not the highest priority IP stream. Accordingly, in one embodiment of the invention, cell 106 is removed from the list of potential new cells during the handover procedure. Since more than one cell broadcasts the highest priority IP stream, mobile terminal 102 then determines which cell is broadcasting the next highest priority IP stream. Cell 108 broadcasts IP stream B, which has a higher priority than IP stream D broadcasted by cell 110. Therefore, the handover will be from cell 104 to cell 108.

Figure 2:
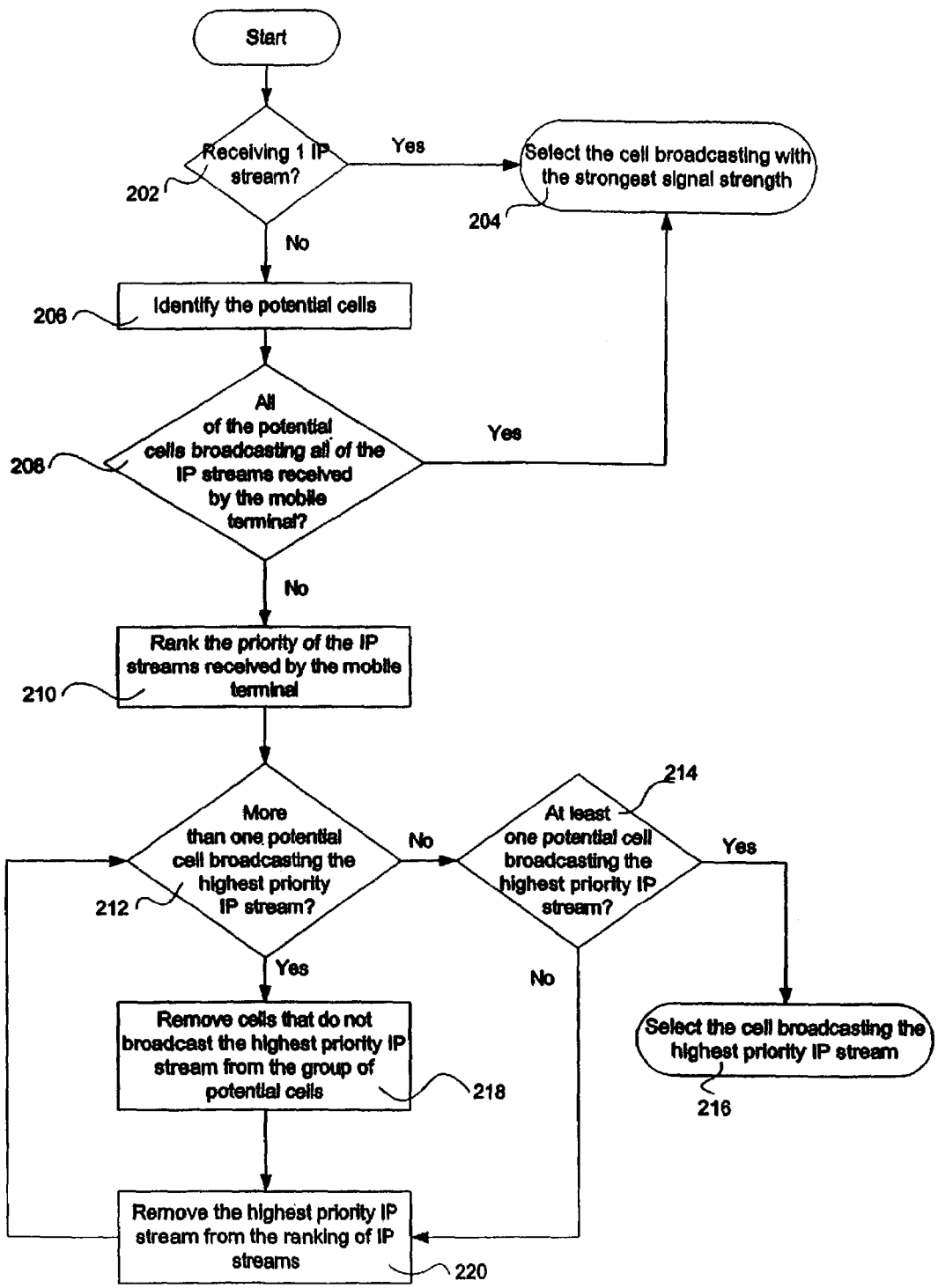
FIG. 2 illustrates a method of making handover decisions in accordance with an illustrative embodiment of the invention.

FIG. 2 illustrates a method of making handover decisions in accordance with an embodiment of the invention. First, in step 202 it is determined whether or not a mobile terminal is receiving only one IP stream. When the mobile terminal is receiving only one IP stream, the cell broadcasting it with the strongest signal strength is selected in step 204. When the mobile terminal is receiving more than one IP stream, in step 206 potential handover cells are identified. Step 206 may include identifying cells broadcasting above a predetermined threshold signal strength level. Next, in step 208 it is determined whether all of the potential cells are broadcasting all of the IP streams received by the mobile terminal. When all of the potential cells are broadcasting all of the IP streams received by the mobile terminal, control returns to step 204 where the cell broadcasting with the strongest signal strength is selected.

When all of the potential cells are not broadcasting all of the IP stream received by the mobile terminal, in step 210 the priority of the IP streams received by the mobile terminal are ranked. Step 210 may be performed by a user ranking each of the IP streams or services. Alternatively, the mobile terminal or service provider may rank the priority of the IP streams. For example, the mobile terminal may be configured to assign the highest priority to IP streams that are carrying files that are in the process of being downloaded by the mobile terminal. In yet another embodiment, the sources of the IP streams may provide information to facilitate the ranking of the IP streams. For example, when delivering streaming video or other time sensitive content, the provider of an IP service may include information that allows a mobile terminal to recognize that the service is commensurate with the highest ranking.

After the priority of the IP streams are ranked in step 210, in step 212 it is determined whether more than one potential cell is broadcasting the highest priority IP stream. When there is not more than one potential cell broadcasting the highest priority IP stream, in step 214 it is determined if at least one potential cell is broadcasting the highest priority IP stream. When there is only one cell broadcasting the highest priority stream, in step 216 the cell broadcasting the highest priority IP stream is selected. When there is not at least one potential cell broadcasting the highest priority IP stream, control transfers to step 220, described below. When there is more than one potential cell broadcasting the highest priority IP stream, in step 218 the cells that do not broadcast the highest priority IP stream are removed from the group of potential cells. Referring to the example shown in FIG. 1, cell 106 is not broadcasting the highest priority IP stream and, therefore, in step 218 cell 106 would be removed from the group of potential cells. Next, in step 220 the highest priority IP stream is removed from the ranking of IP streams. Returning again to the example shown in FIG. 1, after it is determined that cells 108 and 110 both broadcast the highest priority IP stream, during the first instances of step 220, IP stream A would be removed from further analysis for the ranking of IP streams. Control is then returned to step 212 where steps 212, 214, 216, 218 and 220 may be repeated several times until a cell is selected.

The second time the loop of steps 212, 214, 216, 218 and 220 is executed when analyzing the configuration shown in FIG. 1, cell 108 would be selected. In particular, the second time through step 212, cells 108 and 110 would be the potential cells and the highest priority IP stream would be IP stream B. As a result, in step 212 it would be determined that cell 108 is the only cell broadcasting the highest priority IP stream. Step 214 would determine that at least cell 108 is broadcasting the highest priority IP stream and cell 108 would be selected in step 216.

One skilled in the art will appreciate that there are numerous alternative methods that may be used to implement aspects of the present invention. For example, the priority of IP streams does not have to be analyzed in accordance with the method shown in FIG. 2. In one alternative embodiment, when it is determined that more than one potential cell broadcasts the highest priority IP stream, the selection of the new cell can be made based on which of the potential cells broadcasts the highest priority IP streams and the greatest number of IP streams currently being received by the mobile terminal. In yet another embodiment, the user or mobile terminal may identify IP streams that are not currently being received, but are requested and therefore may be considered during the ranking of the priority of IP streams.

Figure 3:
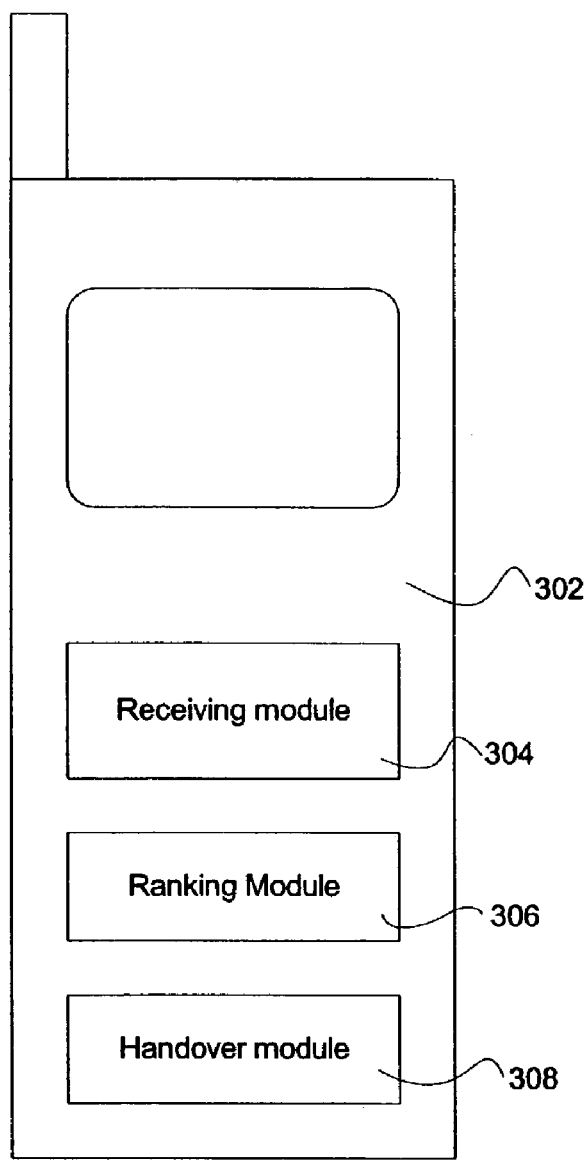
FIG. 3 illustrates a mobile terminal configured to perform handover decisions based on a ranking of IP streams being received by the mobile terminal, in accordance with an illustrative embodiment of the invention.

FIG. 3 illustrates a mobile terminal 302 configured to perform handover decisions based on a ranking of IP streams being received by the mobile terminal. Mobile terminal 302 may include a receiving module 304 for receiving IP streams. In digital broadband transmission network embodiments, such as ATSC and DVB, receiving module 304 may extract IP data from the transmitted multiplexes. A ranking module 306 may be included for ranking the priorities of the IP streams in the manner described above. A handover module 308 may be included for selecting a cell during handover procedures. Mobile terminal 302 may include some or all of the other conventional mobile terminal components (not shown). For example, mobile terminal 302 may be connected to an antenna for receiving radio signals from a transmitter and include a central processing unit (CPU). Receiving module 304 may be connected to the antenna and to the CPU. A keypad, display, audio output and other components and modules may also be connected to the CPU. When mobile terminal 302 is implemented with an integrated 3G/DVB-T or GPRS/DVB-T terminal, mobile terminal 302 may include two antennas, one coupled to a DVB-T receiver and the other coupled to a cellular transceiver. One radio block may be used for cellular services and another one may be used for DVB-T services.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:
1. A method comprising:
(a) identifying at least two potential handover cells for a mobile terminal that is receiving or has requested at least two IP streams broadcasted over a digital broadband transmission network, each stream corresponding to one or more IP services;
(b) ranking the priority of the at least two IP streams that are received or requested by the mobile terminal based on different IP services provided by the at least two IP streams when the at least two potential handover cells are not broadcasting or are not capable of broadcasting all of the at least two IP streams being received or which have been requested by the mobile terminal; and
(c) selecting one from the at least two potential handover cells based on the ranking made in (b).

2. The method of claim 1, wherein (a) comprises identifying signal strengths of the at least two potential cells.

3. The method of claim 1, wherein (a) comprises identifying cells that broadcast at least one of the at least two IP streams.

4. The method of claim 1, wherein (b) comprises a user of the mobile terminal ranking the priority of the at least two IP streams.

5. The method of claim 1, wherein the mobile terminal is configured to perform (b).

6. The method of claim 1, wherein (c) includes identifying which of the at least two IP streams are broadcasted by each of the potential cells.

7. The method of claim 6, wherein (c) comprises selecting a cell that broadcasts the the highest priority IP services when the other cells do not broadcast the highest priority IP service.

8. The method of claim 7, wherein (c) comprises selecting a cell that;
 (i) broadcasts the highest priority IP service that is not broadcasted by any of the other cells that broadcast all of the higher priority IP services; and
 (ii) broadcast all IP services that have priorities higher than the highest priority identified in (i).

9. The method of claim 1, wherein (c) comprises selecting a cell that broadcasts the largest number of the currently received or requested IP streams.

10. The method of claim 1, further including:
 (d) executing a handover from a first cell to a second cell; and wherein the first and second cells belong to separate networks.

11. A mobile terminal comprising:
 a receiving module that receives at least two IP streams, each IP stream corresponding to one or more IP services;
 a ranking module that ranks the priority of the at least two IP streams based on different IP services provided by the at least two IP streams when the at least two potential handover cells are not broadcasting or are not capable of broadcasting all of the at least two IP streams being received or which have been requested by the mobile terminal; and
 a handover module that selects a new cell during a handover procedure based at least in part on information received from the ranking module, the mobile terminal configured to process the at least two IP streams broadcasted over a digital broadband transmission network.

12. A computer-readable medium embodied with computer-executable instructions comprising:
 (a) identifying at least two potential cells for a mobile terminal;
 (b) ranking the priority of at least two IP streams that are received or requested by the mobile terminal based on different IP services provided by the at least two IP streams when the at least two potential handover cells are not broadcasting or are not capable of broadcasting all of the at least two IP streams being received or which have been requested by the mobile terminal; and
 (c) selecting a cell based on the ranking made in (b),
 the computer-readable medium embodied with computer-executable instructions for causing the mobile terminal that is receiving or which has requested the at least two IP streams broadcasted over a digital broadband transmission network to make a handover decision to perform the steps (a) through (c).

13. The computer-readable medium of claim 12, embodied with further computer-executable instructions for causing the mobile terminal to select a cell that:
 (i) broadcasts the highest priority IP service that is not broadcasted by any of the other cells that broadcast all of the higher priority IP services; and
 (ii) broadcasts all IP services that have priorities higher than the highest priority identified in (i).

* * * * *

UNITED STATES PATENT AND TRADEMARK OFFICE
CERTIFICATE OF CORRECTION

PATENT NO. : 7,260,074 B2 Page 1 of 1
APPLICATION NO. : 10/334822
DATED : August 21, 2007
INVENTOR(S) : Jani Väre It is certified that error appears in the above-identified patent and that said Letters Patent is hereby corrected as shown below:

Column 5, Claim 7, Line 15:
    Please replace "broadcasts the the highest" with --broadcasts the highest--

Column 5, Claim 7, Line 15:
    Please replace "services" with --service--

Column 5, Claim 8, Line 19:
    Please replace "that:" with --that;--

Signed and Sealed this

Third Day of June, 2008

JON W. DUDAS
*Director of the United States Patent and Trademark Office*